United States Patent
Kim et al.

(10) Patent No.: US 10,484,977 B2
(45) Date of Patent: *Nov. 19, 2019

(54) METHOD AND APPARATUS FOR THE TRANSMISSION AND RECEPTION OF DOWNLINK CONTROL SIGNALLING IN MOBILE TELECOMMUNICATION SYSTEM

(75) Inventors: Young Bum Kim, Seoul (KR); Ju Ho Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 187 days.

This patent is subject to a terminal disclaimer.

(21) Appl. No.: 13/257,542

(22) PCT Filed: Mar. 17, 2010

(86) PCT No.: PCT/KR2010/001635
§ 371 (c)(1),
(2), (4) Date: Oct. 14, 2011

(87) PCT Pub. No.: WO2010/107238
PCT Pub. Date: Sep. 23, 2010

(65) Prior Publication Data
US 2012/0076090 A1 Mar. 29, 2012

(30) Foreign Application Priority Data
Mar. 17, 2009 (KR) .................. 10-2009-0022632

(51) Int. Cl.
*H04W 4/00* (2018.01)
*H04W 72/04* (2009.01)
(Continued)

(52) U.S. Cl.
CPC ......... *H04W 72/042* (2013.01); *H04L 5/0055* (2013.01); *H04L 5/0098* (2013.01);
(Continued)

(58) Field of Classification Search
CPC ...... H04W 72/04; H04W 88/08; H04W 76/00
(Continued)

(56) References Cited

U.S. PATENT DOCUMENTS

2006/0274712 A1* 12/2006 Malladi ............. H04B 1/70735
370/345
2007/0042784 A1* 2/2007 Anderson ............. H04W 52/34
455/450
(Continued)

FOREIGN PATENT DOCUMENTS

| CN | 1943174 | 4/2007 |
|---|---|---|
| CN | 101146354 | 3/2008 |

(Continued)

OTHER PUBLICATIONS

U.S. Appl. No. 61/110,118, filed Oct. 2008, Marinier et al.*
(Continued)

*Primary Examiner* — Siren Wei
(74) *Attorney, Agent, or Firm* — The Farrell Law Firm, P.C.

(57) ABSTRACT

Provided is a method of transmitting control information of a base station in a mobile communication system includes obtaining scheduling information from a terminal; and transmitting at least two control channels through one down link carrier, wherein each control channel corresponds to a different uplink carrier.

12 Claims, 5 Drawing Sheets

(51) Int. Cl.
  *H04W 72/12* (2009.01)
  *H04L 5/00* (2006.01)
  *H04J 13/00* (2011.01)
  *H04L 27/26* (2006.01)
  *H04W 48/16* (2009.01)

(52) U.S. Cl.
  CPC ... *H04W 72/0453* (2013.01); *H04W 72/1278* (2013.01); *H04W 72/1289* (2013.01); *H04J 13/00* (2013.01); *H04L 27/2601* (2013.01); *H04W 48/16* (2013.01)

(58) Field of Classification Search
  USPC .................. 370/322, 324, 327, 329
  See application file for complete search history.

(56) References Cited

U.S. PATENT DOCUMENTS

| | | | |
|---|---|---|---|
| 2008/0049669 A1* | 2/2008 | Lundby | H04W 24/10 370/329 |
| 2008/0064386 A1 | 3/2008 | Nibe | |
| 2009/0196196 A1* | 8/2009 | Ghosh | H04L 5/0044 370/252 |
| 2009/0258628 A1* | 10/2009 | Lindoff | H04L 27/0014 455/302 |
| 2009/0262711 A1 | 10/2009 | Ahn et al. | |
| 2010/0034150 A1* | 2/2010 | Wang | H04W 72/0453 370/329 |
| 2010/0034163 A1* | 2/2010 | Damnjanovic | H04W 72/0453 370/329 |
| 2010/0035625 A1* | 2/2010 | Damnjanovic et al. | 455/450 |
| 2010/0056171 A1* | 3/2010 | Ramprashad | H04W 16/10 455/452.1 |
| 2010/0110988 A1* | 5/2010 | Marinier | H04B 1/707 370/328 |
| 2010/0113004 A1 | 5/2010 | Cave et al. | |
| 2010/0172290 A1* | 7/2010 | Nam | H04L 1/1854 370/328 |
| 2010/0215011 A1* | 8/2010 | Pan | H04L 5/0064 370/329 |
| 2010/0227569 A1* | 9/2010 | Bala | H04L 5/0007 455/73 |
| 2010/0238986 A1* | 9/2010 | Gholmieh et al. | 375/220 |
| 2010/0254329 A1* | 10/2010 | Pan | H04L 5/001 370/329 |
| 2013/0094483 A1 | 4/2013 | Marinier et al. | |

FOREIGN PATENT DOCUMENTS

| | | |
|---|---|---|
| CN | 101204050 | 6/2008 |
| CN | 101335979 | 12/2008 |
| EP | 1901451 | 3/2008 |
| JP | 2012-507960 | 3/2012 |
| KR | 1020040075583 | 8/2004 |
| WO | WO 2006/125149 | 11/2006 |
| WO | WO 2010/051513 | 5/2010 |

OTHER PUBLICATIONS

U.S. Appl. No. 61/110,118 Provisional Specification.*
U.S. Appl. No. 61/157,758 Provisional Specification.*
U.S. Appl. No. 61/092,722 Provisional Specification.*
U.S. Appl. No. 61/160,167 Provisional Specification.*
PCT/ISA/237 Written Opinion issued on PCT/KR2010/001635(5 pp.).
PCT/ISA/210 Search Report issued on PCT/KR2010/001635 (3 pp.).
Huawei, "Considerations on DC-HSUPA Operation", R1-090886, 3GPP TSG RAN WG1 Meeting #56, Feb. 13, 2009.
Huawei, "Considerations on Multi Carrier Evolution", R1-090168, 3GPP TSG RAN WG1 Meeting #55bis, Jan. 16, 2009.
Huawei, PUCCH Design for Carrier Aggregation, R1-090813, 3GPP TSG RAN WG1 Meeting #56, Feb. 13, 2009.
European Search Report dated Mar. 12, 2015 issued in counterpart application No. 10753688.0-1857.
Chinese Office Action dated Feb. 15, 2015 issued in counterpart application No. 201080012387.2.
Samsung, "Impact on L1 Specifications for Supporting DC-HSUPA", R1-091226, 3GPP TSG RAN WG1 Meeting #56bis, Mar. 23-27, 2009, 3 pages.
Japanese Office Action dated Sep. 18, 2015 issued in counterpart application No. 2014-168306, 6 pages.
CMCC, "Multicarrier Operation and PDCCH Design of Carrier Aggregation", R1-084333, 3GPP TSG RAN WG1 Meeting #55, Nov. 10-14, 2008, 4 pages.
LG Electronics, "Proposals and Issues on the Carrier Aggregation and Control Signaling for LTE-A", R1-084194, 3GPP TSG RAN WG1 #55, Nov. 10-14, 2008, 6 pages.
Qualcomm Europe, "UE Implementation Impact Due to DC-HSUPA", R1-090434, 3GPP TSG RAN WG1 Meeting #55bis, Jan. 12-16, 2009, 13 pages.
Japanese Office Action dated Aug. 1, 2016 issued in counterpart application No. 2015-205353, 6 pages.
NTT DOCOMO, "Initial Access Procedure for Asymmetric Wider Bandwidth in LTE-Advanced", R1-084249, 3GPP TSG RAN WG1 Meeting #55, Nov. 10-14, 2008, 5 pages.
Texas Instruments, "Issues on Carrier Aggregation for Advanced E-UTRA", R1-090280, 3GPP TSG RAN WG1 #55bis, Jan. 12-16, 2009, 5 pages.
LG Electronics, "Initial Access Procedure in LTE-Advanced", R1-090210, 3GPP TSG RAN WG1 Meeting #55bis, Jan. 12-16, 2009, 5 pages.
Samsung, "Initial Random Access in Asymmetric Carrier Aggregation", R1-090093, 3GPP TSG RAN WG1 Meeting #55bis, Jan. 12-16, 2009, 4 pages.
Chinese Office Action dated Apr. 3, 2018 issued in counterpart application No. 201510823552.7, 12 pages.
European Search Report dated Jan. 25, 2018 issued in counterpart application No. 17198126.9-1215, 9 pages.

* cited by examiner

[Fig. 1]
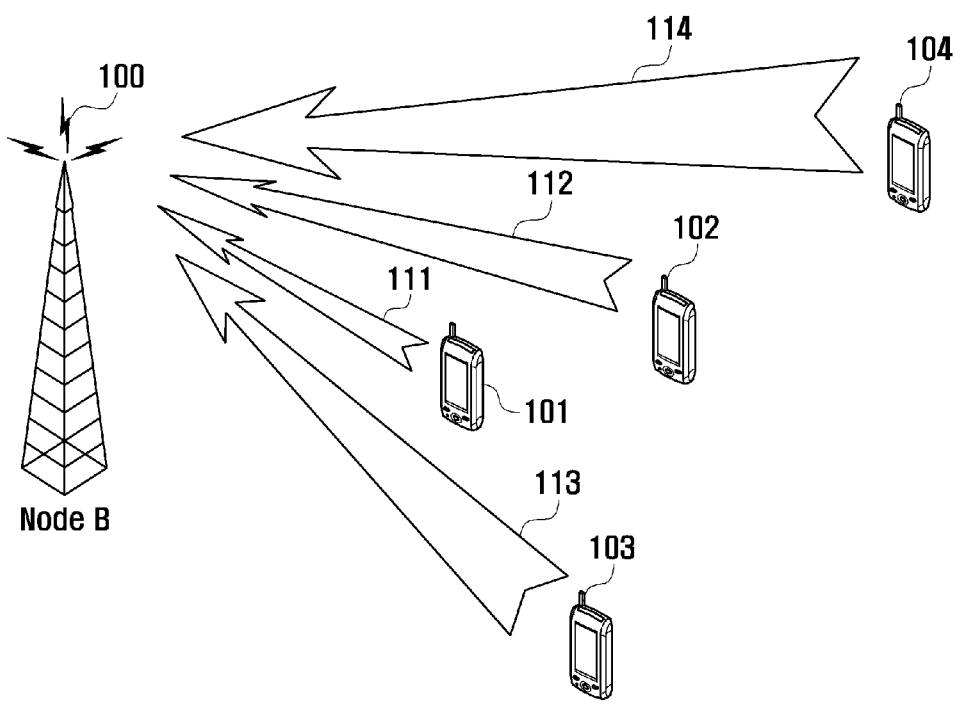

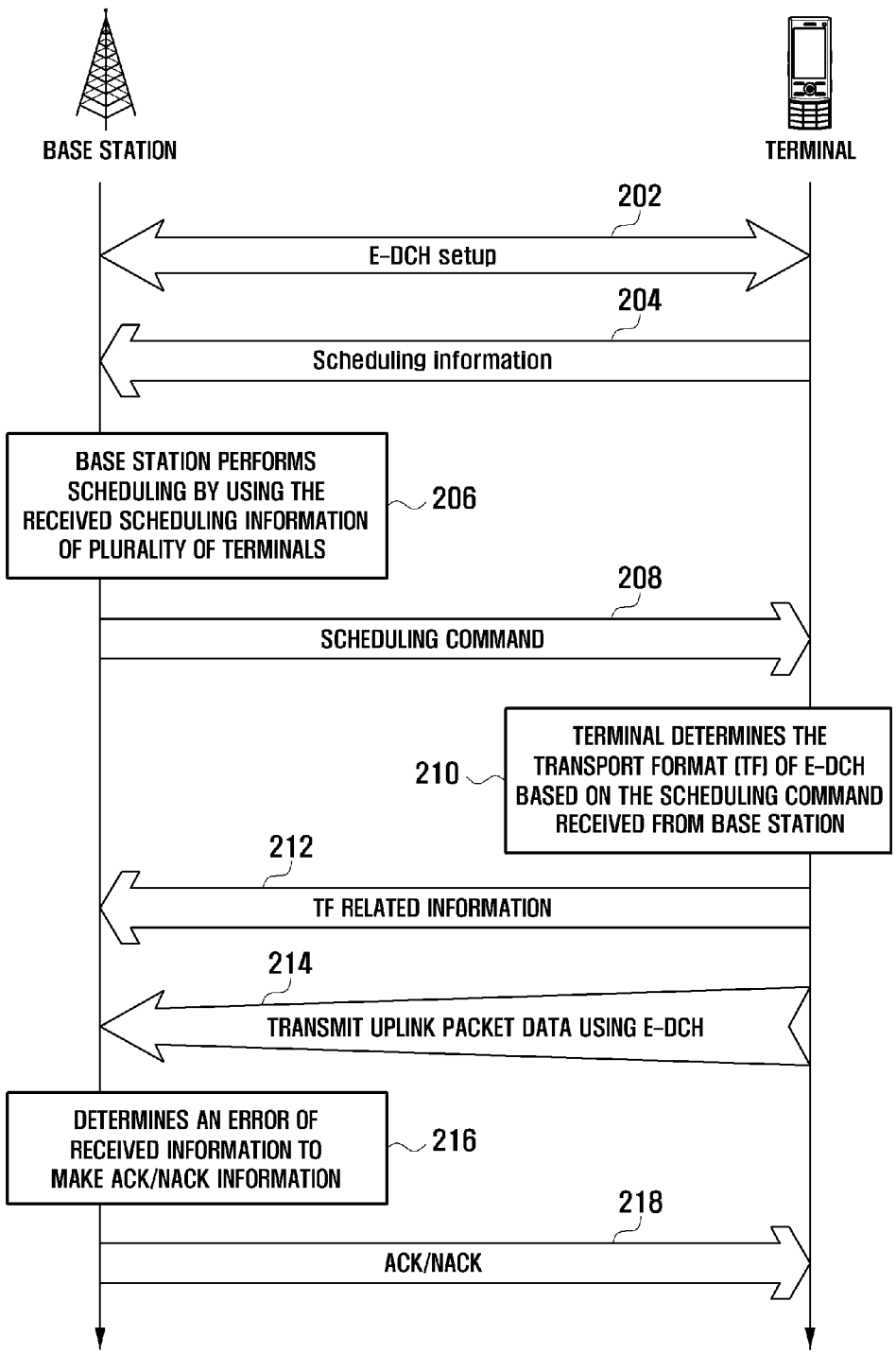

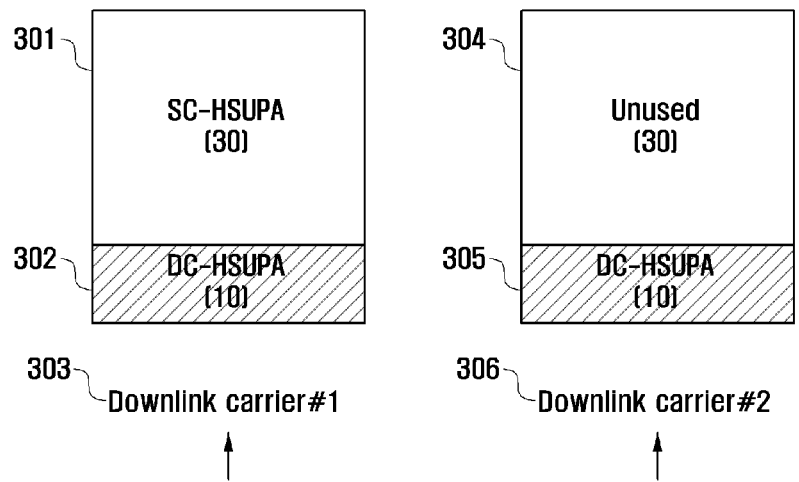
[Fig. 3]
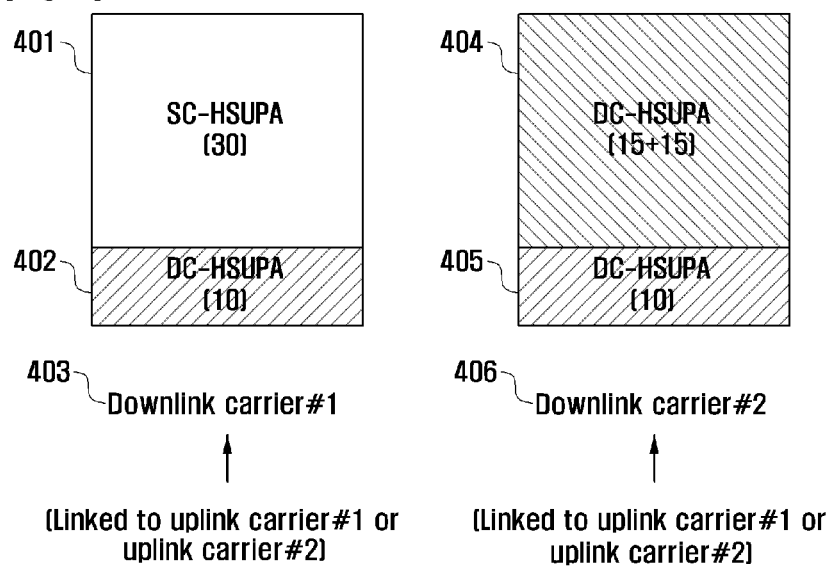
[Fig. 4]

[Fig. 5]
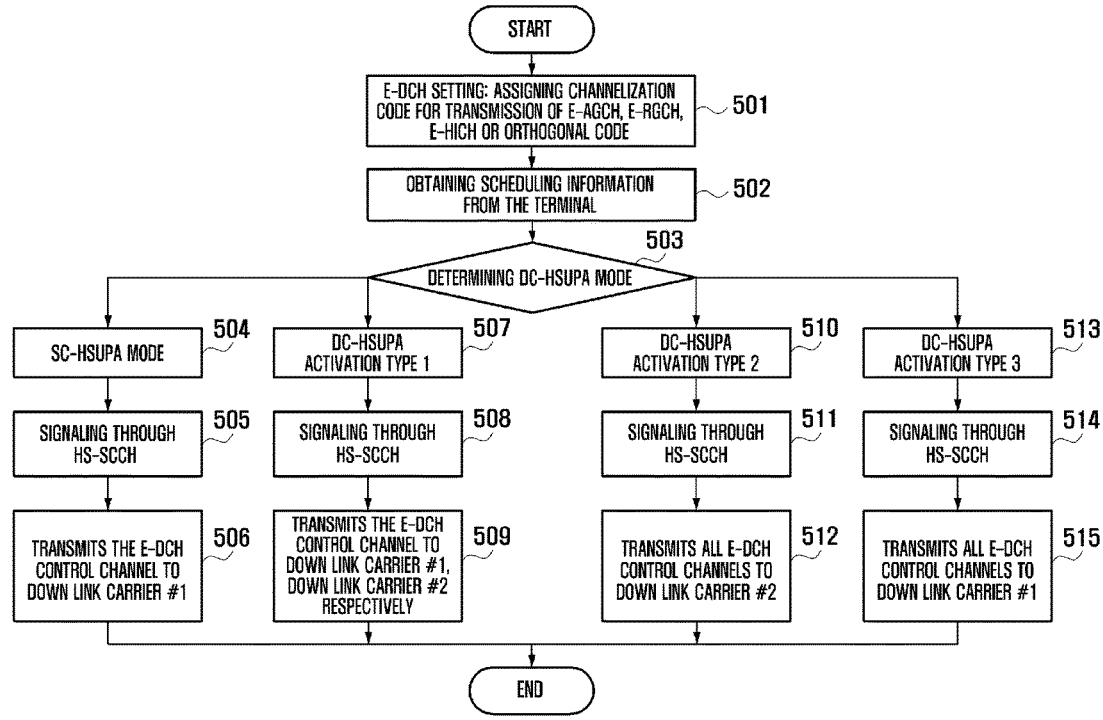
[Fig. 6]
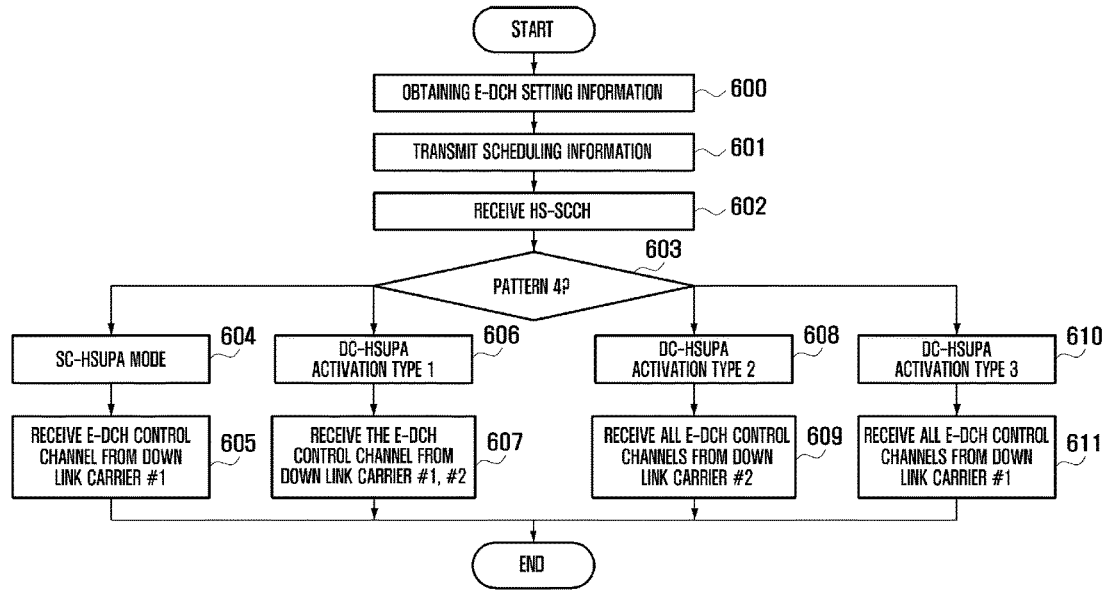

[Fig. 7]
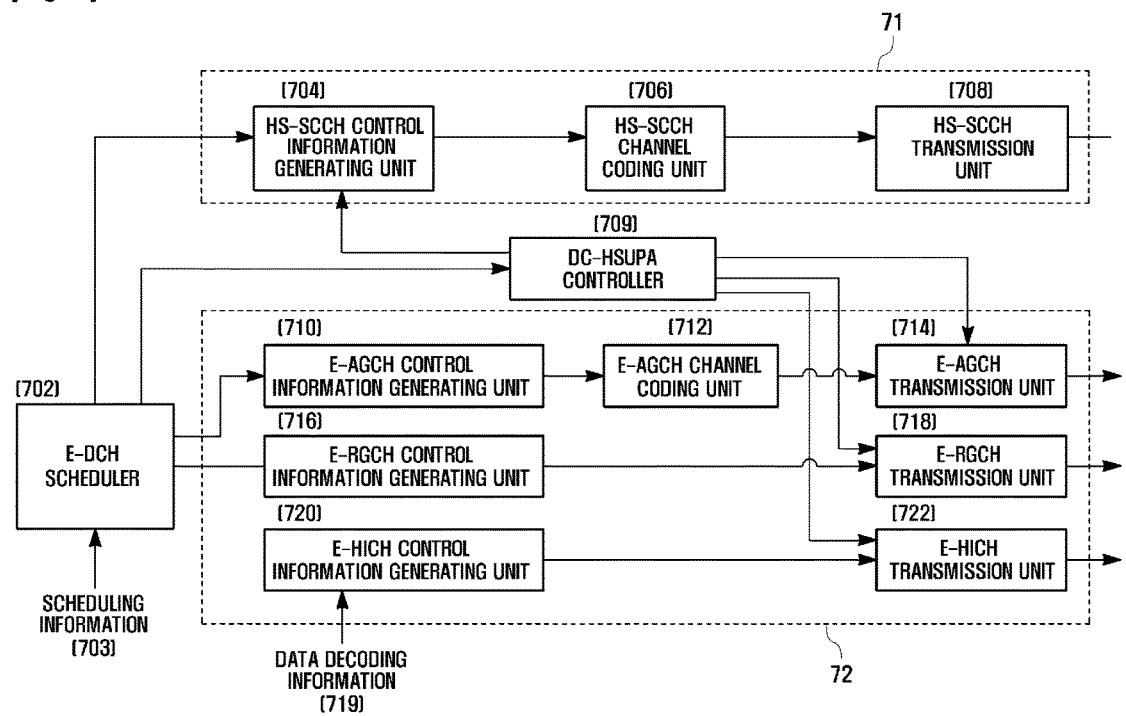
[Fig. 8]
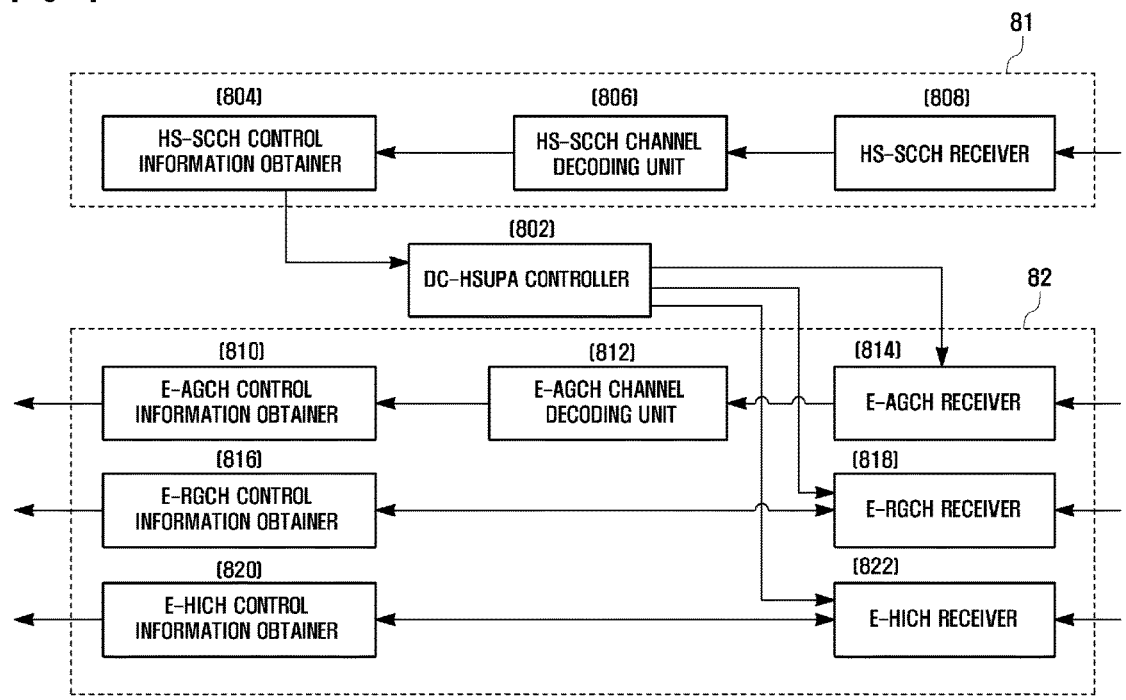

METHOD AND APPARATUS FOR THE TRANSMISSION AND RECEPTION OF DOWNLINK CONTROL SIGNALLING IN MOBILE TELECOMMUNICATION SYSTEM

TECHNICAL FIELD

The present invention relates to a method and apparatus for transmitting and receiving control information in a mobile communication system, and more particularly, to a method and apparatus for transmitting and receiving control information by utilizing a plurality of carriers depending on the amount of the remaining transmission resources in a mobile communication system.

BACKGROUND ART

The present invention relates to a cellular code division multiple access (CDMA) communication system, and, particularly, it is assumed that packet data is transmitted using an enhanced uplink dedicated transport channel through a plurality of carriers.

A universal mobile telecommunication service (UMTS) system that is a third generation mobile communication system which is based on a global system for mobile communications (GSM) and general packet radio services (GPRS) that are a European mobile communication system and uses CDMA (code division multiple access) provide consistent services through which mobile phone or computer users can transmit packet-based texts, digitalized voice, video and multimedia data at a high speed faster than 2 Mbps anywhere in the world.

Particularly, the UMTS system uses a transmission channel which is called an enhanced uplink dedicated channel (hereinafter, EUDCH or E-DCH) in order to improve packet transmission performance in an uplink (UL) communication, i.e., a reverse direction communication from user equipment (UE) to base station (BS, node B). The E-DCH supports such technologies as adaptive modulation and coding (AMC), hybrid automatic retransmission request (HARM), base station control scheduling, and shorter transmission time interval (TTI) size in order to support stable, high-speed data transmission.

AMC is a technology that increases use efficiency of resources by determining the modulation method and coding method of data channel depending on the channel state between the base station and the terminal. Combination of the modulation method and the coding method is called MCS (modulation and coding scheme), and it is possible to define various MCS levels according to supportable modulation methods and coding methods. AMC adaptively determines the MCS level according to the channel state between the terminal and the base station, thereby increasing use efficiency of resources.

HARQ refers to a technique that retransmits a packet in order to compensate for an error packet when there is an error in an initially transmitted data packet. The composite retransmission technique can be divided into the chase combining (CC) technique which retransmits packets having format which is identical with the initially transmitted format when an error occurs and the incremental redundancy (IR) technique which retransmits packets having format which is different from the initially transmitted format when an error occurs.

Base station control scheduling refers to a method in which the base station determines whether to transmit uplink data and the upper limit of the possible data rate when transmitting data using E-DCH, and if the determined information is transmitted to the terminal as a scheduling command, the terminal determines the data transmission rate of possible uplink E-DCH with reference to the scheduling command and transmits the data.

Shorter TTI size reduces retransmission delay time by allowing TTI smaller than 10 ms, which is the minimum TTI of the current Rel5, thereby allowing high system throughput. A system or a service that uses such an E-DCH is called HSUPA (high speed packet access).

FIG. 1 illustrates uplink packet transmission through E-DCH in a wireless communication system. Here, reference numeral 100 refers to a base station that supports E-DCH, i.e., node B (hereinafter, "base station" and "node B" refer to the same), and reference numerals 101, 102, 103 and 104 refer to terminals that are using E-DCH. As illustrated, the terminals 101 to 104 transmit data to a base station 100 through E-DCH 111, 112, 113 and 114, respectively.

The base station 100 informs whether it is possible to transmit EUDCH data for each terminal by utilizing information of the data buffer state, requested data transmission rate or channel situation information, or performs scheduling of adjusting EUDCH data transmission rate. Scheduling is performed in a manner that allocates low data transmission rate to terminals (e.g., 103 or 104) which are located far away from the base station and allocates high data transmission rate to terminals (e.g., 101 or 102) which are located close to the base station while keeping the measured noise rise or RoT (rise over thermal) value of the base station under the target value in order to increase the performance of the overall system. The terminals 101 to 104 determine the allowed maximum data transmission rate of E-DCH data according to the scheduling information, determine the transmission rate of E-DCH data within the allowed maximum data transmission rate, and transmit E-DCH data.

In the uplink, uplink signals transmitted by different terminals do not keep synchronization between the signals, so they are not orthogonal and operate as interference to each other. Hence, the greater the amount of uplink signals received by the base station becomes, the greater the amount of interference to the uplink signals of a certain terminal becomes, thereby lowering the receiving performance. In order to overcome this problem, it is possible to increase the uplink transmission power of the certain terminal, but again it will operate as interference to other uplink signals, thereby lowering receiving performance. Hence, the entire power of the uplink signal, which can be received while the base station secures receiving power, is limited. RoT (Rise Over Thermal) represents wireless resources the base station uses in the uplink, which is defined in the following equation 1.

MathFigure 1

$$ROT = I\_0/N\_0 \qquad [\text{Math.1}]$$

Here, I_0 is power spectral density for the entire receiving band of a base station, and indicates the amount of the entire uplink signals received by the base station. N_0 is thermal noise power spectral density of the base station. Hence, the allowed maximum ROT is the entire wireless resources that the base station can use in the uplink.

The entire ROT of a base station is represented by the sum of interference between cells, voice traffic and E-DCH traffic. If the base station control scheduling is used, the phenomenon that several terminals simultaneously transmit packets at a high data transmission rate can be prevented, so that the receiving ROT can be kept within the target ROT, thereby always securing performance. That is, the base station control scheduling prevents the receiving ROT from being increased to more than the target ROT by not allowing high data transmission rate to other terminals in case high data transmission rate is allowed to a certain terminal.

FIG. 2 is a flowchart illustrating a typical transmission and reception procedure through E-DCH.

Referring to FIG. 2, a base station and a terminal set E-DCH (202). The setting process at step 202 includes a transmission process of messages through a dedicated transport channel. When E-DCH is set, the terminal informs the base station of scheduling information (204). The scheduling information may be terminal transmission power information that indicates reverse direction channel information, extra power information that the terminal can transmit, and the amount of data to be transmitted, which has been piled up in the buffer of the terminal, or the like.

The base station which received scheduling information from a plurality of terminals that are communicating monitors the scheduling information of the plurality of terminals in order to perform scheduling on data transmission of each terminal (206). Specifically, the base station determines to allow reverse direction packet transmission to the terminal, and transmits a scheduling command to the terminal (208).

The scheduling command can direct the terminal to increase/maintain/decrease the allowed maximum data transmission rate through RG (relative grant) command. Alternatively, the scheduling command can direct through AG (absolute grant) command including the allowed maximum data transmission rate and transmission-allowed timing. The downlink physical channel that transmits the RG command is called E-RGCH (E-DCH Relative Grant Channel), and the downlink physical channel that transmits the AG command is called E-AGCH (E-DCH Absolute Grant Channel.

The terminal determines the transport format (TF) of E-DCH to be transmitted in a reverse direction using the scheduling command (210), and transmits reverse direction (UL) packet data (212) and transmits the TF information to the base station at the same time (214) through E-DCH. Here, the TF information includes a transport format resource indicator (TFRI) which indicates resource information that is necessary in de-modulating E-DCH. Here, at step 214, the terminal selects the MCS level in consideration of the allowed maximum data transmission rate allocated from the base station and the channel state, and transmits the reverse direction packet data using the MCS level.

The base station determines whether there is an error in the TF information or the packet data (216). As a result of the determination at step 216, if an error is found, the base station transmits NACK (negative acknowledge) to the terminal (218). On the other hand, as a result of the determination at step 216, if an error is not found, the base station transmits ACK (acknowledge) to the terminal through ACK/NACK channel (218). In case ACK information is transmitted, the packet data transmission is completed, and the terminal transmits new user data through E-DCH, however, in case NACK information is transmitted, the terminal retransmits packet data of the same contents through E-DCH. Here, the downlink physical channel through which the ACK/NACK is transmitted is called E-HICH (E-DCH HARQ Indicator Channel).

DISCLOSURE OF INVENTION

Technical Problem

In the above environment, in order for the base station to efficiently perform scheduling, in case of capable of receiving information like the buffer state and power state of the terminal, the base station can allocate low data rate to a terminal which is located far away, a terminal whose channel state is not good, or a terminal in which the priority of data to be serviced is low, or can allocate high data rate to a terminal which is located close, a terminal whose channel state is good, or a terminal in which the priority of data to be serviced is high, thereby increasing the performance of the entire system.

In order to additionally improve system performance of the existing HSUPA system operating like the above description, DC (dual carrier or dual cell)-HSUPA is being discussed, in which two carriers (uplink carrier #1 and uplink carrier #2) in the uplink and two carriers (downlink carrier #1 and downlink carrier #2) in the downlink are combined and operated. Each carrier corresponds to 5 MHz bandwidth of the existing UMTS system, and DC-HSUPA system supports 10 MHz for the uplink and 10 MHz for the downlink, respectively.

The present invention intends to provide a method and apparatus for preventing a case where a downlink signal overhead is generated and a signaling overhead is generated in a certain carrier in DC-HSUPA system.

Solution to Problem

The present invention has been made in view of the above problems, and provides a method and apparatus for transmitting and receiving control information, which can prevent a case where overhead is generated as downlink signal is concentrated on a certain downlink carrier in DC-HSUPA system, and can reduce signaling overhead.

In accordance with an aspect of the present invention, a method of transmitting control information of a base station in a mobile communication system includes obtaining scheduling information from a terminal; and transmitting at least two control channels through one down link carrier, wherein each control channel corresponds to a different uplink carrier.

In accordance with another aspect of the present invention, a method of receiving control information of a base station in a mobile communication system includes transmitting scheduling information to a base station; and receiving at least two control channels from the base station through one down link carrier, wherein each control channel corresponds to a different uplink carrier.

In accordance with another aspect of the present invention, a base station for transmitting control information in a mobile communication system includes a scheduler that performs scheduling by using scheduling information received from a terminal; and a control information processing module that controls to transmit at least two control channels through one down link carrier, wherein each control channel corresponds to a different uplink carrier.

In accordance with another aspect of the present invention, a terminal for receiving control information in a mobile communication system includes a controller that controls to transmit scheduling information to a base station; and a control information reception module that receives at least two control channels through one down link carrier from the base station, wherein each control channel corresponds to a different uplink carrier.

Advantageous Effects of Invention

According to the present invention, a case where overhead is generated as downlink signal is concentrated on a certain downlink carrier in DC-HSUPA system, and signaling overhead is reduced, thereby improving performance of a mobile communication system.

BRIEF DESCRIPTION OF DRAWINGS

The objects, features and advantages of the present invention will be more apparent from the following detailed description in conjunction with the accompanying drawings, in which:

FIG. 1 is a drawing illustrating an uplink packet transmission through E-DCH in a typical wireless telecommunications system;

FIG. 2 is a message flow diagram illustrating a transceive procedure through a typical E-DCH;

FIG. 3 is a drawing illustrating an example of non-efficient use of a downward link resource operation in a DC-HSUPA system;

FIG. 4 is a drawing illustrating a downward link transmission resource to which a control channel is transmitted according to an exemplary embodiment of the present invention;

FIG. 5 is a flowchart illustrating a control information transmission method of a base station according to an exemplary embodiment of the present invention;

FIG. 6 is a flowchart illustrating a control information receiving method of a terminal according to an exemplary embodiment of the present invention;

FIG. 7 is a drawing illustrating an apparatus for transmitting control information of a base station according to an exemplary embodiment of the present invention; and FIG. 8 is a drawing illustrating an apparatus for receiving control information of a terminal according to an exemplary embodiment of the present invention.

MODE FOR THE INVENTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

The present invention relates to a system in which E-DCH is applied to a plurality of uplink carriers in a UMTS communications system, and more particularly, to a DC-HSUPA system in which two uplink carriers and two down link carriers are used. In detail, the method for transmitting a down link control channel for supporting the DC-HSUPA system is illustrated through an exemplary embodiment of the present invention.

The meaning of terms is clarified in this disclosure, so the claims should be read with careful attention to these clarifications. Specific examples are given, but those of skill in the relevant art will understand that other examples may also fall within the meaning of the terms used, and within the scope of one or more claims. Terms do not necessarily have the same meaning here that they have in general usage, in the usage of a particular industry, or in a particular dictionary or set of dictionaries. In the event of an irresolvable conflict between a term's meaning as used expressly herein and the term's meaning as used in an incorporated document, the express meaning herein governs. Consequently, as described above, hereinafter, the present invention will be illustrated with an exemplary embodiment of DC-HSUPA system. However, it is obvious that the present invention is not limited to such system but can be applied to mobile communication system that supports high speed data service using a plurality of frequency bands. In other words, an exemplary embodiment of the present invention can be applied to mobile communication system such as LTE (Long Term Evolution) or LTE-A (Long Term Evolution-Advanced) which is an evolved high speed wireless data communication standard.

In addition, the existing HSUPA system using one uplink carrier is called SC (single cell or single carrier-HSUPA) to be distinguished from the DC-HSUPA. A down link control channel for supporting SC-HSUPA includes E-AGCH for scheduling grant, E-RGCH, and E-HICH for retransmission. The above illustrated down link control channel can be specified in a corresponding uplink carrier, and can include identification information for this.

If the present invention is applied to LTE or LTE-A system, the E-AGCH, E-RGCH of HSUPA may correspond to the PDCCH (Physical Downlink Control Channel) of LTE (or LTE-A), and the E-HICH of HSUPA may correspond to the PHICH (Physical Hybrid-ARQ Indicator Channel) of LTE (or LTE-A).

The E-AGCH is a channelization code having spreading factor (SF) 256 and an ID of each terminal, being classified by each terminal. The E-RGCH and E-HICH are a channelization code having spreading factor 128 and, additionally, an orthogonal code having a length 40, being classified by each terminal. In the E-DCH setting step 202 illustrated in FIG. 2, the base station informs to terminal through an additional control information (e.g., upper layer signaling) that which channelization code and orthogonal code will be used for each terminal.

FIG. 3 is a drawing illustrating an example of downward link resource operation in the case where the existing SC-HSUPA system is expanded and applied to DC-HSUPA.

For example, in case of E-HICH or E-RGCH, maximum 40 terminals can be supported by using one channelization code and an orthogonal code having a length 40. The number indicated in FIG. 3 means the number of the SC-HSUPA terminal or the DC-HSUPA terminal in one channelization code that can be supported for each down link carrier. In FIG. 3, it is assumed that a down link control channel corresponding to uplink carrier #1 is transmitted through a down link carrier #1 303 and a down link control channel corresponding to uplink carrier #2 is transmitted through a down link carrier #2 306. In case the maximum number of terminal which can be supported in each down link carrier 303, 306 is forty while thirty SC-HSUPA terminals are already served (301) in the down link carrier #1 303, maximum ten DC-HSUPA terminals can be supported 302, 305. In FIG. 3, it was assumed that the DC-HSUPA terminal should receive a down link control channel from each carrier. Thus, even if forty resources of the down link carrier #2 306 are usable, only ten extra resources exist (302) in the down link carrier #1 303. Accordingly, maximum 10 (=min (10, 40)) DC-HSUPA terminals can be supported. According to an exemplary embodiment of the present invention, in order to solve the inefficiency of resource usage as shown in FIG. 3, the down link control channel corresponding to each uplink carrier #1 or uplink carrier #2 is allowed to be transmitted to any one of the down link carrier #1 and the down link carrier #2.

Furthermore, according to the present invention, the base station transmits at least two control channels to terminal through one down link carrier, and the respective control channel correspond to different uplink carrier. Here, "correspond to" means that each control channel can have identification information that can be specified in uplink carrier.

FIG. 4 is a drawing illustrating a downward link transmission resource to which a control channel is transmitted according to an exemplary embodiment of the present invention.

In FIG. 4, even when the SC-HSUPA terminal already serves 30 people 401 in the down link carrier #1 403, the extra ten resources 402 of the down link carrier #1 and the extra forty resources 404, 405 of the down link carrier #2 can altogether support the DC-HSUPA terminal. Therefore, in this case, the number of supportable DC-HSUPA terminal becomes 25(=(10+40)/2). Among the DC-HSUPA terminal of 25 people, the down link control channel for 10 people is divided into down link carrier #1 and down link carrier #2 to be transmitted respectively 402, 405 and the down link control channel for the rest 15 people is altogether transmitted to down link carrier #2 404. That is, at least two down link control channels are transmitted through one down link carrier.

The down link carrier through which down link control channel for the DC-HSUPA terminal is transmitted by base station is determined according to the resource for control channel transmission, i.e., the channelization code or the amount of the orthogonal code. The base station informs, through additional control information (signaling), information of a down link carrier through which down link control channel for supporting a DC-HSUPA terminal is transmitted.

Even in case of the DC-HSUPA terminal, terminal can operate in a DC-HSUPA mode or a SC-HSUPA mode according to a data amount to be transmitted by terminal or a channel state. For instance, in case the data amount to be transmitted by terminal is small, the data can be transmitted in the SC-HSUPA mode rather than in the DC-HSUPA mode. Accordingly, the battery consumption of the terminal can be reduced. To this end, according to an exemplary embodiment of the present invention, the base station informs terminal, through signaling, of information of operation mode, i.e., information indicating that current operation mode is a SC-HSUPA mode or a DC-HSUPA mode. In addition, since the base station informs, at once, terminal of the information of a down link carrier through which down link control channel for supporting the DC-HSUPA terminal is transmitted and the information of operation mode, i.e., information indicating that it is operated in a DC-HSUPA mode or in a SC-HSUPA mode, so that an additional signaling overhead is reduced. In the embodiment of the present invention, as described above, the information which informing whether a terminal served by base station uses a plurality of carriers (DC-HSUPA mode/ SC-HSUPA mode) and informing a location of carrier to which control channel (control information) is transmitted depending on the use of a plurality of carriers is called "control channel transmission resource information". Such information is transmitted through a high speed-shared control channel (HS-SCCH). That is, base station informs of control channel transmission resource information (HS-SCCH control information) to terminal through the HS-SCCH according to an exemplary embodiment of the present invention. As described above, the control channel transmission resource information is information informing whether terminal uses a plurality of carriers and information of carrier location to which control channel is transmitted. In detail, the base station informs an information of a down link carrier through which a down link control channel for supporting DC-HSUPA terminal is transmitted and an information indicating whether it will operate in a DC-HSUPA mode or in a SC-HSUPA mode to the terminal through a control channel transmission resource information. According to the embodiment of this the present invention, following information is transmitted through HS-SCCH. The HS-SCCH does not accompany an additional data channel and independently operates. The HS-SCCH is comprised of total 37 bits. Initial 8 bits use a value fixed with a first pattern which is previously designated. The first pattern which is previously designated is '11100000'. Next 6 bits, after the previously designated first pattern 8 bits, use a value fixed with a second pattern which is previously designated. The second pattern which is previously designated is '111101'. Next 3 bits, after the previously designated second pattern 6 bits, use a value fixed with a third pattern which is previously designated. The third pattern which is previously designated is '010'. The base station informs to the terminal with the third pattern that the HS-SCCH includes control information about DC-HSUPA. In case the third pattern is '001', it informs that the HS-SCCH is used to indicate the discontinuous reception (DRX) operation, the discontinuous transmission (DTX) operation for the increase of battery efficiency of a terminal, and informs that the HS-SCCH includes control information about DC-HSDPA in case the third pattern is '000'. Next 3 bits, after the previously designated third pattern 3 bits, is a fourth pattern indicating the operation of DC-HSUPA in detail, including following four types of information. Such information includes an information indicating whether a plurality of carrier are used and an information indicating a carrier through which control channel (control information) is transmitted.

'DC-HSUPA deactivation'
'DC-HSUPA activation type 1'
'DC-HSUPA activation type 2'
'DC-HSUPA activation type 3'

'DC-HSUPA deactivation' information indicates to operate in the SC-HSUPA mode when receiving the signaling, even if the terminal is possible to support the DC-HSUPA. 'DC-HSUPA activation type 1' indicates that a terminal which currently operates in the SC-HSUPA mode should operate in the DC-HSUPA mode and, at the same time, a down link control channel corresponding to each uplink carrier is transmitted through each down link carrier. It is useful when a resource amount available in each down link carrier is similar.

'DC-HSUPA activation type 2' indicates that a terminal which currently operates in the SC-HSUPA mode should operate in the DC-HSUPA mode and, at the same time, a down link control channel corresponding to each uplink carrier is transmitted through a down link carrier #2. It is useful when a resource amount available in each down link carrier is greater in the down link carrier #2.

'DC-HSUPA activation type 3' indicates that a terminal which currently operates in the SC-HSUPA mode should operate in the DC-HSUPA mode and, at the same time, a down link control channel corresponding to each uplink carrier is transmitted through a down link carrier #1. It is useful when a resource amount available in each down link carrier is greater in the down link carrier #1.

After the forth pattern which is comprised of 3 bits, next 1 bit is reserved. And the above-described the first, second, third, and forth pattern and the additional single bit is generated by performing an XOR operation on the CRC 16 bits generated by a control information input with the terminal identifier (UE-ID) 16 bits. The base station performs convolution coding on the total 37 bits control information generated like this and transmits it to the terminal. As described above, the control channel transmission resource information according to an exemplary embodiment of the present invention is transmitted through HS-SCCH. And, for this reason, it will be used together with the HS-SCCH control information. Particularly, the fourth pattern of the HS-SCCH control information includes information indicating whether terminal uses a plurality of carriers and informing the location of the carrier to which control information is transmitted. And then, in the DC-HSUPA system which operates as described above, the control information transmission method of the base station is illustrated.

FIG. 5 is a flowchart illustrating a control information transmission method of a base station according to an exemplary embodiment of the present invention.

Referring to FIG. 5, the base station performs the setting of E-DCH (501). Here, the resource such as E-AGCH, E-RGCH, E-HICH which are a down link control channel of E-DCH is assigned for each terminal. The resource (hereinafter, 'resource #1') of E-DCH down link control channels corresponding to uplink carrier #1 is assigned to a terminal that supports DC-HSUPA, while the resources (hereinafter, 'resource #2') of E-DCH down link control channels corresponding to the uplink carrier #2 is also assigned. The 'resources #1' and the 'resources #2' are set not to be overlapped each other, so that the E-DCH down link control channel can be easily altogether transmitted to the down link carrier #1 or to the down link carrier #2. The base station obtains, from the terminal, terminal transmission power information, extra power information that terminal can transmit, and scheduling information including an amount of data, which are piled in the buffer of the terminal, to be transmitted (502). The base station obtaining the scheduling information determines the DC-HSUPA mode for each terminal from the obtained scheduling information (503). The DC-HSUPA mode includes, first, the SC-HSUPA mode, i.e., the DC-HSUPA deactivation mode, second, the DC-HSUPA activation type 1 mode, third, the DC-HSUPA activation type 2 mode, and, fourth, the DC-HSUPA activation type 3 mode. In case it is determined as 'SC-HSUPA ('DC-HSUPA deactivation')' mode, the base station generates HS-SCCH control information indicating a corresponding mode (504), transmits HS-SCCH to the terminal (505). Next, the base station transmits the E-DCH control channel corresponding to uplink carrier #1 through down link carrier #1 (506). In case it is determined as 'DC-HSUPA activation type 1' mode, the base station generates HS-SCCH control information indicating a corresponding mode (507), transmits HS-SCCH to the terminal (508). Next, the base station transmits the E-DCH control channel corresponding to uplink carrier #1 through down link carrier #1, transmits the E-DCH control channel corresponding to uplink carrier #2 through down link carrier #2 (509). In case it is determined as 'DC-HSUPA activation type 2' mode, the base station generates HS-SCCH control information indicating a corresponding mode (510), transmits HS-SCCH to the terminal (511). Next, the base station transmits both the E-DCH control channel corresponding to uplink carrier #1 through down link carrier #2 and the E-DCH control channel corresponding to uplink carrier #2 through down link carrier #2 (512). In case it is determined as 'DC-HSUPA activation type 3' mode, the base station generates HS-SCCH control information indicating a corresponding mode (513), transmits HS-SCCH to the terminal (514). Next, the base station transmits both the E-DCH control channel corresponding to uplink carrier #1 through down link carrier #1 and the E-DCH control channel corresponding to uplink carrier #2 through down link carrier #1 (515). The method of receiving E-DCH control information by terminal in a DC-HSUPA system in response to the control information transmission method of base station is explained.

FIG. 6 is a flowchart illustrating a control information receiving method of a terminal according to an exemplary embodiment of the present invention.

Referring to FIG. 6, the terminal obtains the E-DCH setting information from the base station (600). The terminal can know the resource information of E-DCH down link control channel from the setting information. The terminal transmits scheduling information to the base station (601). Next, the terminal receives HS-SCCH and acquires the information of DC-HSUPA mode (602). The terminal recognizes the DC-HSUPA mode according to the value of fourth pattern among the obtained control information (603), and branches off to step 604, 606, 608 or 610, according to the DC-HSUPA mode. In case the value of fourth pattern indicates 'SC-HSUPA mode ('DC-HSUPA deactivation')', the terminal recognizes that DC-HSUPA is deactivated (604), receives the E-DCH control channel corresponding to uplink carrier #1 through down link carrier #1 (605). In the meantime, in case the value of fourth pattern indicates 'DC-HSUPA activation type 1' mode, the terminal can know that the E-DCH control channel corresponding to the uplink carrier #1 is transmitted through down link carrier #1, and the E-DCH control channel corresponding to uplink carrier #2 is transmitted through down link carrier #2 (606). Therefore, the terminal receives the E-DCH control channel corresponding to uplink carrier #1 through down link carrier #1, and receives the E-DCH control channel corresponding to uplink carrier #2 through down link carrier #2 (607). Moreover, in case the value of fourth pattern indicates 'DC-HSUPA activation type 2' mode, the terminal recognizes that the E-DCH control channels corresponding to uplink carrier #1 and uplink carrier #2 respectively are altogether transmitted through down link carrier #2 (608). Next, the terminal altogether receives the E-DCH control channel corresponding to uplink carrier #1 and the E-DCH control channel corresponding to uplink carrier #2 through down link carrier #2 (609). And in case the value of fourth pattern indicates 'DC-HSUPA activation type 3' mode, the terminal recognizes that down link control channel corresponding to respective uplink carrier #1 and #2 is transmitted through down link carrier #1 (610). Accordingly, the terminal altogether receives the E-DCH control channel corresponding to uplink carrier #1 and the E-DCH control channel corresponding to uplink carrier #2 through down link carrier #1 (611). Next, the apparatus for transmitting E-DCH down link control information of base station according to an exemplary embodiment of the present invention is illustrated.

FIG. 7 is a drawing illustrating an apparatus for transmitting control information of a base station according to an exemplary embodiment of the present invention.

Referring to FIG. 7, the apparatus for transmitting control information of base station according to the embodiment of the present invention includes a E-DCH scheduler (hereinafter, "scheduler") 702, a HS-SCCH control information generating unit 704, a HS-SCCH channel coding unit 706, a HS-SCCH transmission unit 708, a DC-HSUPA controller (hereinafter, "controller") 709, a E-AGCH control information generating unit 710, a E-AGCH channel coding unit 712, a E-AGCH transmission unit 714, a E-RGCH control information generating unit 716, a E-RGCH transmission unit 718, a E-HICH control information generating unit 720, and a E-HICH transmission unit 722.

Here, the HS-SCCH control information generating unit 704, the HS-SCCH channel coding unit 706 and the HS-SCCH transmission unit 708 are a control channel transmission resource process module for generating and transmitting control channel transmission resource information. The E-AGCH control information generating unit 710, the E-AGCH channel coding unit 712, the E-AGCH transmission unit 714, the E-RGCH control information generating unit 716, the E-RGCH transmission unit 718, the E-HICH control information generating unit 720, and the E-HICH transmission unit 722 are a control information process module for generating and transmitting control information.

By using scheduling information 703 received from the terminal, the scheduler 702 performs scheduling for each terminal.

The controller 709 receives scheduling result from the scheduler 702, and determines the DC-HSUPA mode which is control channel transmission resource information. That is, the controller 709 determines one of the 'SC-HSUPA' mode, the 'DC-HSUPA activation type 1' mode, the 'DC-HSUPA activation type 2' mode, and the 'DC-HSUPA activation type 3' mode.

The control channel transmission resource process module 71 generates control channel transmission resource information including information indicating whether a plurality of uplink carrier are used, according to the DC-HSUPA mode which is determined by the controller 709, and transmits this information to each terminal. Each configuration of the control channel transmission resource process module 71 is illustrated in detail.

The HS-SCCH control information generating unit 704 generates the HS-SCCH control information (control channel transmission resource information) corresponding to the DC-HSUPA mode which is determined by the controller 709. And then, the HS-SCCH channel coding unit 706 performs convolutional coding on the HS-SCCH control information which is generated by the HS-SCCH control information generating unit 704 and outputs it.

Then, the HS-SCCH transmission unit 708 transmits the HS-SCCH control information which is convolutional coded to the terminal after the operation of spreading/scrambling and RF processing.

In the meantime, the control information process module 72 controls the base station to transmit at least two control channels through one down link carrier. That is, according to the DC-HSUPA mode which is control channel transmission resource information determined by the controller 709, the control information process module 72 transmits each control channel including AG information, RG information and re-transmission (ACK/NACK) information through one allocated down link carrier. Each configuration of the control information process module is illustrated in detail.

The E-AGCH control information generating unit 710 receives scheduling result from the E-DCH scheduler 702 and generates absolute grant (AG) information. And then, the E-AGCH channel coding unit 712 performs convolutional coding on the AG information which is created by the E-AGCH control information generating unit 710. The E-AGCH transmission unit 714 transmits the convolutional coded AG information to the terminal after the operation of spreading/scrambling and the RF processing. At this time, the E-AGCH transmission unit 714 receives information which indicating a down link carrier through which respective E-AGCHs corresponding to uplink carrier #1 and uplink carrier #2 are transmitted and resource information used for the transmission of E-AGCH, from the DC-HSUPA controller 709. Accordingly, the E-AGCH transmission unit 714 performs a processing for the AG information according to the received information, and transmits it to the terminal.

The E-RGCH control information generating unit 716 receives scheduling result from the E-DCH scheduler 702, and generates relative grant (RG) information. The E-RGCH transmission unit 718 transmits the RG information generated by the E-RGCH control information generating unit 716 to the terminal after the operation of orthogonal code mapping/spreading/scrambling and the RF processing. At this time, the E-RGCH transmission unit 718 receives information which indicating a down link carrier through which respective E-RGCHs corresponding to uplink carrier #1 and uplink carrier #2 are transmitted and resource information used for the transmission of E-RGCH, from the DC-HSUPA controller 709. Accordingly, the E-RGCH transmission unit 718 performs a processing for the RG information according to the received information, and transmits it to the terminal.

The E-HICH control information generating unit 720 receives uplink data decoding information 719, and generates retransmission (ACK/NACK) information informing the retransmission. The E-HICH transmission unit 722 transmits the generated retransmission (ACK/NACK) information to the terminal after the operation of orthogonal code mapping/spreading/scrambling and the RF processing. At this time, the E-HICH transmission unit 722 receives information which indicating a down link carrier through which respective E-HICHs corresponding to uplink carrier #1 and uplink carrier #2 are transmitted and resource information used for the transmission of E-HICH, from the DC-HSUPA controller 709. Accordingly, the E-HICH transmission unit 722 performs a processing for the re-transmission information, and transmits it to the terminal. Next, an apparatus for receiving E-DCH down link control information of terminal according to an exemplary embodiment of the present invention is illustrated.

FIG. 8 is a drawing illustrating an apparatus for receiving control information of a terminal according to an exemplary embodiment of the present invention.

Referring to FIG. 8, the apparatus for receiving control information according to the embodiment of the present invention includes a DC-HSUPA controller (hereinafter, "controller") 802, a HS-SCCH control information obtainer 804, a HS-SCCH channel decoding unit 806, a HS-SCCH receiver 808, a E-AGCH control information obtainer 810, a E-AGCH channel decoding unit 812, a E-AGCH receiver 814, a E-RGCH control information obtainer 816, a E-RGCH receiver 818, a E-HICH control information obtainer 820, and a E-HICH receiver 822.

Here, the HS-SCCH control information obtainer 804, the HS-SCCH channel decoding unit 806, and the HS-SCCH receiver 808 are included in a control channel transmission resource reception module 81. Moreover, the E-AGCH control information obtainer 810, the E-AGCH channel decoding unit 812, the E-AGCH receiver 814, the E-RGCH control information obtainer 816, the E-RGCH receiver 818, the E-HICH control information obtainer 820, and the E-HICH receiver 822 are included in a control information reception module 82.

The control channel transmission resource reception module 81 receives control information including information indicating whether a plurality of uplink carriers are used or not from base station. In more detail, the control channel transmission resource reception module 81 receives control channel transmission resource information (HS-SCCH control information) through HS-SCCH and obtains control channel transmission resource information. Each configuration of such control channel transmission resource reception module 81 is as follows.

The HS-SCCH receiver 808 receives HS-SCCH and performs descrambling/dispreading. Then, the HS-SCCH channel decoding unit 806 decodes HS-SCCH. The HS-SCCH control information obtainer 804 obtains control channel transmission resource information from the HS-SCCH decoded by the HS-SCCH channel decoding unit 806. That is, the HS-SCCH control information obtainer 804 obtains information indicating whether a plurality of carriers are used and information about the DC-HSUPA mode informing the location of carrier to which control information is transmitted. Next, the HS-SCCH control information obtainer 804 inputs the obtained control channel transmission resource information to the controller 802.

The controller 802 controls to transmit scheduling information to the base station. Moreover, the controller of the present invention controls the control information reception module 82 according to the inputted control channel transmission resource information. The control information reception module 82 receives at least two control channels from the base station through one down link carrier. That is, the control information reception module 82 receives control information in the location of carrier indicated by the control channel transmission resource information under the control of the controller 802. Each configuration of such control information reception module 82 is as follows.

The E-AGCH receiver 814 receives information indicating a carrier from which E-AGCH is received among down link carrier #1 or down link carrier #2 and information indicating a resource through which E-AGCH is received among down link carrier #1 or down link carrier #2, from the controller 802. The E-AGCH receiver 814 receives E-AGCH through a corresponding carrier and resource according to the received information, and performs descrambling and dispreading on the received E-AGCH to output. If then, the E-AGCH channel decoding unit 812 decodes E-AGCH and outputs it. The E-AGCH control information obtainer 810 obtains the AG value of E-AGCH. The E-RGCH receiver 818 receives information indicating a carrier from which E-RGCH is received among down link carrier #1 or down link carrier #2 and information indicating a resource through which E-AGCH is received among down link carrier #1 or down link carrier #2, from the controller 802. The E-AGCH receiver 814 receives E-RGCH through a corresponding carrier and resource according to the received information, and performs descrambling and dispreading on the received E-RGCH to output. If then, the E-RGCH control information obtainer 816 obtains the RG value from E-RGCH. The E-HICH receiver 822 receives information indicating a carrier from which E-HICH is received among down link carrier #1 or down link carrier #2 and information indicating a resource through which E-HICH is received among down link carrier #1 or down link carrier #2, from the controller 802. The E-HICH receiver 814 receives E-HICH according to the received information, and performs descrambling and dispreading on the received E-HICH to output. If then, the E-HICH control information obtainer 820 obtains the ACK/NACK value which is re-transmission information.

In the meantime, the present invention can also be applied to LTE-A system that supports carrier aggregation.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

The invention claimed is:

1. A method by a terminal in a communication system, the method comprising:
   receiving scheduling carrier information from a base station;
   identifying a first carrier associated with a transmission of control information for a data transmission on a second carrier based on the scheduling carrier information; and
   receiving the control information on a resource in the first carrier,
   wherein the scheduling carrier information indicates that the first carrier is an own carrier compared to the second carrier or an index of the first carrier in a case that the first carrier is an other carrier compared to the second carrier,
   wherein in a case that the scheduling carrier information indicates that the first carrier is the own carrier, the first carrier is linked to the second carrier, and
   wherein in a case that the scheduling carrier information indicates the index of the first carrier, the first carrier is not linked to the second carrier.

2. The method of claim 1, wherein the resource is identified based on a carrier identifier of the second carrier.

3. The method of claim 1, further comprising:
   transmitting data on the second carrier based on the control information.

4. A method by a base station in a communication system, the method comprising:
   identifying a first carrier associated with a transmission of control information for a data transmission on a second carrier;
   transmitting scheduling carrier information associated with the first carrier to a terminal; and
   transmitting the control information on a resource in the first carrier,
   wherein the scheduling carrier information indicates that the first carrier is an own carrier compared to the second carrier or an index of the first carrier in a case that the first carrier is an other carrier compared to the second carrier,
   wherein in a case that the scheduling carrier information indicates that the first carrier is the own carrier, the first carrier is linked to the second carrier, and
   wherein in a case that the scheduling carrier information indicates the index of the first carrier, the first carrier is not linked to the second carrier.

5. The method of claim 4, wherein the resource is identified based on a carrier of the second carrier.

6. The method of claim 4, further comprising:
   receiving data on the second carrier based on the control information.

7. A terminal in a communication system, the terminal comprising:
   a transceiver configured to transmit and receive a signal; and
   a controller configured to:
   receive scheduling carrier information from a base station,
   identify a first carrier associated with a transmission of control information for a data transmission on a second carrier, and
   receive the control information on a resource in the first carrier, wherein the scheduling carrier information indicates that the first carrier is an own carrier compared to the second carrier or an index of the first carrier in a case that the first carrier is an other carrier compared to the second carrier, wherein in a case that the scheduling carrier information indicates that the first carrier is the own carrier, the first carrier is linked to the second carrier, and wherein in a case that the scheduling carrier information indicates the index of the first carrier, the first carrier is not linked to the second carrier.

8. The terminal of claim 7, wherein the resource is identified based on a carrier identifier of the second carrier.

9. The terminal of claim 7, wherein the controller is further configured to control to transmit data on the second carrier based on the control information.

10. A base station in a communication system, the base station comprising:
- a transceiver configured to transmit and receive a signal; and
- a controller configured to:
  - identify a first carrier associated with a transmission of control information for a data transmission on a second carrier,
  - transmit scheduling carrier information associated with the first carrier to a terminal, and
  - transmit the control information on a resource in the first carrier, wherein the scheduling carrier information indicates that the first carrier is an own carrier compared to the second carrier or an index of the first carrier in a case that the first carrier is an other carrier compared to the second carrier, wherein in a case that the scheduling carrier information indicates that the first carrier is the own carrier, the first carrier is linked to the second carrier, and wherein in a case that the scheduling carrier information indicates the index of the first carrier, the first carrier is not linked to the second carrier.

11. The base station of claim 10, wherein the resource is identified based on a carrier identifier of the second carrier.

12. The base station of claim 10, wherein the controller is further configured to control to receive data on the second carrier based on the control information.

* * * * *